C. H. LANGILL.
Cotton-Press.

No. 221,683. Patented Nov. 18, 1879.

Attest:
H. E. Bathrick
Harry VanDuzee

Inventor:
Charles H. Langill
per Edw. Dummer
Atty.

UNITED STATES PATENT OFFICE.

CHARLES H. LANGILL, OF LAWSONVILLE, TEXAS.

IMPROVEMENT IN COTTON-PRESSES.

Specification forming part of Letters Patent No. 221,683, dated November 18, 1879; application filed June 9, 1879.

*To all whom it may concern:*

Be it known that I, CHARLES H. LANGILL, of Lawsonville, in the county of Rusk and State of Texas, have invented a new and useful Improvement in Cotton-Presses, which improvement is fully set forth in the following specification, reference being had to the accompanying drawings.

My invention relates to a press particularly adapted for pressing cotton into bales; and it consists, first, in having two screws, one right-handed and the other left-handed, nuts thereon being moved by worm-gears, into which work two worms of opposite spirals, in combination with friction-rollers revolving on studs fixed in rings between the nuts and bearings, to reduce the friction arising from the endwise thrust; secondly, in the arrangement of the box and combination of the same with the screws, as hereinafter described.

Figure 1:
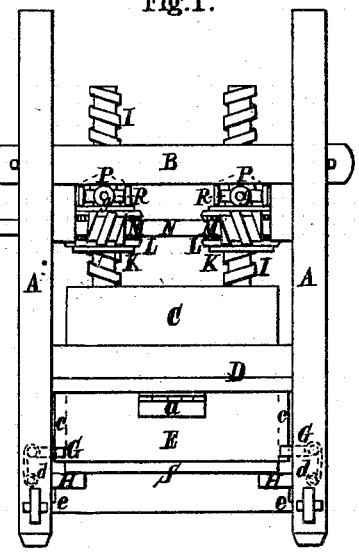
Figure 2:
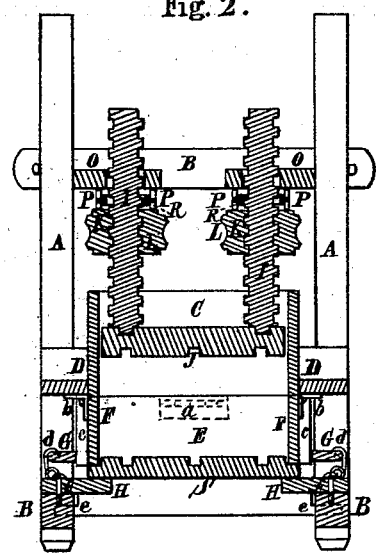
Figure 3:
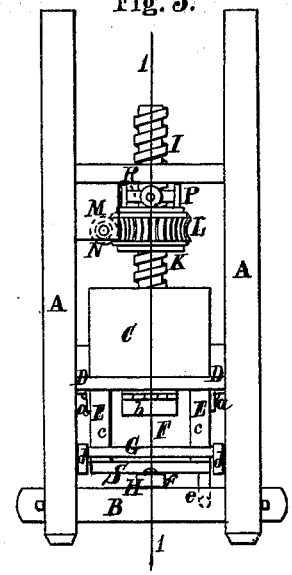

In the drawings, Figure 1 is a front elevation of a press embodying my invention. Fig. 2 is a vertical section taken on line 1 1 of Fig. 3. Fig. 3 is an end elevation.

Four posts, A, and four cross-pieces, B, form the main portion of the frame-work. The box in which the cotton is to be pressed has the upper portion, C, of sides rigidly fixed in reference to each other and to the frame-work, being further supported by cross-bars D. The lower portion of the box has the four sides E and F, which are, by hinges $a$ and $b$, hinged to the upper portion, as shown, so as to swing outward. The two sides E extend and have cleats $c$ to shut over the sides F. Bars G, which are attached to the frame by the double hinges $d$, embrace, when swung up, the sides E at their ends, and hold these sides in place, to form, with the sides F, the lower portion of the box. The bottom S of the box is pivoted at $e$, so that it may be swung downward, and when raised to complete the box is held in place and against the pressure by braces H, which swing as buttons on pivots at $f$.

The pressure is obtained by means of two screws, I, one right-handed and the other left-handed, bearing against the plate or platen J. The nuts K for these screws have connected fixedly with them the worm-gears L, which are fitted to be revolved by the worms M. These worms are of opposite spirals, and are fixed on the one driving-shaft N.

Between the nuts K and the supports O, which receive the end-thrust of the nuts when the pressure is given, are rollers P. These rollers are held in place in reference to each other by and revolve on studs $g$, fixed in rings R.

The parts being arranged as described and shown, the operation is as follows: The sides E and F and bottom S being closed and held by the cleats $c$, bars G, and braces H, and the shaft N being revolved by power from any suitable source, the nuts K will be revolved, pressing the screws I and the platen J downward, and the cotton placed within the box will be compressed. Owing to the worms M being spiral in opposite directions, the end-thrust exerted on one will be balanced by that on the other, and there will be no end-thrust to the shaft N. The rollers P will greatly reduce the friction between the nuts K and the bearings O, which receive their end-thrust, thus reducing the power necessary to operate the machine and the wear and tear.

After the cotton is pressed and formed into a bale and bound, by simply dropping the bottom and releasing and swinging outward the sides E and F, the bale may be quickly and readily removed, and the box thereupon readily closed to compress another bale.

I claim as my invention—

A cotton-press having screws I, nuts K, bearings O, and rings R, having studs $g$ fixed therein, which keep in place, and on which revolve the rollers P, in combination with the box formed of the upper portion, C, of fixed sides and the lower portion of the hinged sides E and F, held by the cleats $c$ and bars G, attached by the double hinges $d$, and bottom S, held by the braces H, pivoted at $f$, substantially as hereinbefore described.

CHARLES H. LANGILL.

Witnesses:
B. F. MONTGOMERY,
C. L. FALKNER.